(12) United States Patent
Mysliwitz (10) Patent No.: US 8,824,515 B2
(45) Date of Patent: Sep. 2, 2014

(54) LASER APPARATUS AND METHOD FOR PROCESSING OBJECTS WITH A LASER WHICH IS CONTROLLABLE IN TERMS OF THE PULSE ENERGY

(75) Inventor: Daniel Mysliwitz, Munich (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 13/988,373

(22) PCT Filed: Nov. 18, 2011

(86) PCT No.: PCT/EP2011/070422
§ 371 (c)(1),
(2), (4) Date: May 20, 2013

(87) PCT Pub. No.: WO2012/066110
PCT Pub. Date: May 24, 2012

(65) Prior Publication Data
US 2014/0064308 A1 Mar. 6, 2014

(30) Foreign Application Priority Data

Nov. 18, 2010 (DE) .......................... 10 2010 044 128

(51) Int. Cl.
*H01S 3/10* (2006.01)
(52) U.S. Cl.
USPC ..................... 372/25; 372/29.01; 372/29.014; 372/29.015; 372/29.021; 372/30; 372/38.07
(58) Field of Classification Search
USPC ......... 372/25, 29.01, 29.014, 29.015, 29.021, 372/30
See application file for complete search history.

(56) References Cited

U.S. PATENT DOCUMENTS

| 3,996,457 A | 12/1976 | Gabriel |
| 5,226,051 A | 7/1993 | Chan et al. |
| 5,986,688 A | 11/1999 | Schaaf |
| 2002/0033873 A1 | 3/2002 | Okano et al. |
| 2010/0177797 A1 | 7/2010 | Appleyard et al. |

FOREIGN PATENT DOCUMENTS

| DE | 112005003088 T5 | 10/2007 |
| DE | 102008025776 A1 | 12/2009 |
| DE | 102008028705 A1 | 12/2009 |
| WO | 2009007721 A2 | 1/2009 |

*Primary Examiner* — Dung Nguyen
(74) *Attorney, Agent, or Firm* — Laurence A. Greenberg; Werner H. Stemer; Ralph E. Locher (57) ABSTRACT

A laser processing apparatus, a filter device and a method are used for controlling a pulse laser, which is controllable in terms of its pulse energy and of a temporal triggering of laser pulses, during material processing of an object, in particular during the marking of a plastics-based document. The method includes comparing a pulse energy signal which assumes voltage values, in temporal correlation with a clock signal, which represent a pulse energy for the laser pulses for processing, with a threshold value condition and generating a logic result signal. The clock signal is passed to a gate and controlling the gate using the logic result signal and generating a retrieval signal thereby. An energy control signal is provided which has a voltage according to a specification of a control voltage. The retrieval signal and the energy control signal are used to control the pulse laser.

14 Claims, 2 Drawing Sheets

LASER APPARATUS AND METHOD FOR PROCESSING OBJECTS WITH A LASER WHICH IS CONTROLLABLE IN TERMS OF THE PULSE ENERGY

BACKGROUND OF THE INVENTION

Field of the Invention

The invention relates to a processing apparatus for processing an object, in particular for the laser marking of a document produced on the basis of plastic, and to a corresponding method, which use a pulsed laser that is controllable with regard to a pulse energy and a temporal retrieval of laser pulses, and to a filter device for filtering the signals used for laser driving.

It is known from the prior art to mark objects, for example documents, in particular valuable and security documents, produced on the basis of plastic, using a laser. Documents produced on the basis of plastic are often joined together from individual films consisting of the same plastic or different plastics, to form a document body. In this case, some or all of the films are configured such that they comprise pigments which are imperceptible or at least not conspicuous to the human observer and which promote absorption of laser radiation. The energy absorbed during the absorption of the laser radiation is used to alter the plastic material of the correspondingly prepared film, i.e. the layer formed from said film, in the document. In particular, chemical compounds of the polymers from which the plastic material is formed are broken up and carbonization is brought about. This leads to blackening of the plastic material, which is for example originally transparent. Alternatively it is possible to bring about other color changes or structural changes by means of the laser irradiation.

During laser marking of, for example, plastic-based documents, it is possible to supervise a degree of blackening of the plastic by means of control of a pulse energy of the individual laser pulses. It is thereby possible to produce for example gray shades during the laser marking. Advantageously, each pixel is produced by an interaction of a single laser pulse with the material of the document. By means of a beam guiding device, therefore, the laser beam generated by the laser is moved over the document, such that individual pixels on the document or inside the document are respectively marked by the individual pulses in the laser beam.

Depending on the specifically desired processing predefined by processing information, it is therefore necessary to vary the pulse energy of successive pulses. Particularly when introducing and/or producing characters that are intended to be produced with a uniform degree of blackening, a change between a predefined pulse energy, in particular a maximum pulse energy, and a very low or even no pulse energy at adjacent marking locations is required. The production of new characters and symbols on and/or in an object, in particular an object produced on the basis of plastic, is also designated here as marking. However, marking is not taken to mean identification of entities present, for example, characters, symbols or the like. Consequently, marking should be understood as a synonym for the terms introducing, applying and/or producing in connection with the storage of information by means of optically perceptible changes in the object.

Laser processing apparatuses are known in which the pulsed laser used for marking has an energy control input for receiving an analog signal, the voltage of which controls the laser pulse energy. In addition, such a pulsed laser has a retrieval input for receiving a signal by means of which a retrieval of the laser pulses is controllable temporally. A clock signal is generally used for retrieving the laser pulses. A beam guiding device is controlled in a manner adapted to said clock signal, i.e. in a manner temporally correlated with the clock signal, such that the beam output by the laser is passed with each clock pulse predefined by the clock signal to a new processing position on the object. Consequently, if the clock signal predefines temporally equidistant clock pulses for example by means of equidistant rectangular pulses, laser pulses are retrieved by the laser in temporally equidistant succession. An energy of said pulses is then predefined by means of the pulse energy signal, which is varied in a manner temporally correlated with the clock signal in accordance with the processing information. Temporally correlated variation is understood to mean that the value of the pulse energy signal is adapted such that the pulse energy signal has, in each case at a retrieval instant defined by the clock signal for a laser pulse, a value which specifies the desired pulse energy for this retrieved laser pulse.

Temporally equidistant is understood here to mean a uniform temporal distance between in each case two successive events, for example rectangular pulses. A temporally equidistant clock pulse has a constant clock frequency at least during a plurality of clock cycles.

In practice, it has been found that some pulsed laser systems, in particular diode-pumped fiber lasers, have a low-pass filter characteristic with regard to a temporal variation of the pulse energy, in particular when the pulse energy is increased. This means that upon a change from a, for example, minimum pulse energy to a maximum pulse energy, the actual pulse energy after the requested change does not correspond to the requested pulse energy. The pulse energies exhibited by temporally successive laser pulses initially rise over some pulses until the maximum pulse energy is attained.

If such an apparatus is intended to be used to implement for example processing information representing a microscript, in which individual structures, e.g. lines of characters, have a line thickness corresponding to one or a few pixels, then a high-contrast implementation is not satisfactorily possible with the apparatus known from the prior art.

DE 11 205 003 088 T5 discloses a laser apparatus having two positioning mechanisms, by means of which a laser beam can be directed alternately onto different target regions. The intention is thereby to utilize as far as possible all the pulses of the laser for material processing and to avoid fluctuations of a pulse energy. This laser processing apparatus involves a high outlay since it requires two positioning mechanisms.

BRIEF SUMMARY OF THE INVENTION

Therefore it is an object of the invention to provide a laser apparatus, a method and a device which, without a high constructional outlay, allow uses of the apparatuses or methods known from the prior art, and to eliminate the disadvantages mentioned above.

Basic Concept of the Invention

The invention is based on the basic concept of processing the signals hitherto used for controlling the pulsed laser by means of an additional device, and outputting modified signals for the control of the pulsed laser, such that the pulsed laser can provide upon request from pulses immediately a desired pulse energy including for individual pulses.

In particular, a laser processing apparatus for the laser processing of an object, in particular for the laser marking of a document produced on the basis of plastic, is proposed. The laser processing apparatus comprises a pulsed laser, which is controllable with regard to its pulse energy, and a temporal retrieval of laser pulses and which comprises an energy control input for receiving an analog signal, the voltage of which controls the laser pulse energy, and a retrieval input for receiving a signal by means of which a retrieval of the laser pulses is controllable temporally, and a control device, designed to generate, on the basis of processing information, a pulse energy signal which, in a manner temporally correlated with a clock signal, assumes voltage values which represent a pulse energy for the laser pulses which are retrievable by means of the clock signal, wherein the pulse energy signal and the clock signal are passed into a filter device wherein the filter device comprises a comparator device for comparing a voltage of the pulse energy signal with at least one predefinable threshold value condition and generating a logic result signal; a gate, to which the clock signal is passed, wherein the gate is controlled by means of the logic result signal and thereby generates and outputs a retrieval signal, and an adjustable voltage source, which outputs an energy control signal with a voltage in accordance with a predefinition for a control voltage, proposed.

The logic result signal can assume two physical states, which are assigned to the logic values TRUE and FALSE.

The gate used can be any controllable device, in particular an AND gate, which converts the clock signal into a retrieval signal in a manner controlled by the logic result signal, wherein the gate in one state "allows to pass" information contained in the clock signal and impresses said information on the retrieval signal and, in another state, this forwarding of information is "blocked" and the impression on the retrieval signal fails to occur. If the gate is embodied for example as a logic AND gate circuit, then the clock signal and the logic result signal are passed to the inputs of the logic AND gate circuit. The latter is dimensioned such that both the voltage levels occurring in the clock signal and the voltage levels occurring in the logic result signal for the respective input of the logic AND gate circuit are identified as two different logic states. This means that the states occurring in the clock signal are likewise assigned in each case to one of the logic values True and FALSE. In this case, the output signal of the logic AND gate circuit is then the retrieval signal generated in accordance with a logic AND combination from the logic values of the logic result signal and of the clock signal.

Furthermore, there is proposed a filter device for laser driving of a pulsed laser which is controllable with regard to its pulse energy and a temporal retrieval of laser pulses and which comprises an energy control input for receiving an analog signal, the voltage of which controls the laser pulse energy, and a retrieval input for receiving a signal by means of which a retrieval of the laser pulses is controllable temporally, wherein the filter device comprises a pulse energy input for receiving a pulse energy signal which, in a manner temporally correlated with a clock signal, assumes voltage values which represent a pulse energy for the laser pulses which are retrievable by means of the clock signal, and a clock input for receiving the clock signal, and an energy control signal output and a retrieval signal output and furthermore, a comparator device for comparing a voltage of the pulse energy signal with at least one predefinable threshold value condition and generating a logic result signal and a gate circuit to which the clock signal is passed and which is controlled by means of the logic result signal and thereby generates a retrieval signal and outputs it at the retrieval signal output, and an adjustable voltage source which outputs an energy control signal with a predefinable control voltage at the energy control signal output.

In addition, there is proposed a method for controlling a pulsed laser which is controllable with regard to its pulse energy and a temporal retrieval of laser pulses, during material processing of an object in particular during the marking of a plastic-based document, comprising the following steps: comparing a pulse energy signal which, in a manner temporally correlated with a clock signal, assumes voltage values which represent a pulse energy for the laser pulses for processing with a threshold value condition and generating a logic result signal; passing the clock signal to a gate and controlling the gate by means of the logic result signal and generating a retrieval signal thereby; providing an energy signal having a voltage in accordance with a predefinition for a control voltage; and using the retrieval signal and the energy signal for controlling the pulsed laser. Preferably, the gate is controlled such that the retrieval signal is generated in the gate such that the voltage of the retrieval signal follows that of the clock signal for one of the logic states of the logic result signal and otherwise assumes a predefined value, for example 0 V.

The proposed laser apparatus, the proposed filter device and the proposed method are particularly suitable for use for marking a document with personalizing and/or individualizing information, i.e. for introducing said information.

The advantage is that components which provide a corresponding pulse energy signal can be used without being changed and, by means of the additional filter device, the control signal can be modified in a simple manner in order subsequently to be able to produce even small structures with high contrast. The choice of the threshold value condition makes it possible to stipulate that for processing the object only such information content of the processing information is used for the processing of which, for example, a specific pulse energy is exceeded or the pulse energy of which lies for example in a specific energy window. This affords the possibility of providing for example valuable and/or security documents such as passports, driving licenses or the like with microscript or multidimensional dot codes (e.g. 3D barcodes), having only processed or non-processed, for example marked (optically changed) or non-marked (optically unchanged) positions or pixels. Nevertheless, the marking can be implemented with maximum contrast. Low-pass filter properties of conventional fiber lasers can be "circumvented" by the invention. A marking with high contrast is thereby made possible. It is possible to produce characters, images, etc. with high contrast in a document.

Definitions

Valuable and/or security documents are considered to be all those documents which are protected against copying, falsification, duplication or the like by security features. Security documents include, in particular, passports, personal identification cards, identity cards, driving licenses, visas, labels for safeguarding products, corresponding packagings and documents which embody a value such as, for example, banknotes, checks, but also bank cards, telephone cards, prepaid cards, to name just a few.

Security features are features which at least make it more difficult or make it totally impossible to copy, forge and/or falsify, duplicate or carry out other manipulations on the valuable and/or security documents. By way of example, special printing methods or other marking methods, but also holograms, structures or objects inserted into documents such as microchips and antennas or the like can be used as a security feature. Diverse security features which can be used individually or in combination in valuable and/or security documents are known to the person skilled in the art.

A clock signal is considered to be an electrical and/or optical signal which comprises pulses having edges which represent a great signal change in short time periods. By way of example, signals having rectangular pulses are suitable as clock signals, wherein the edges of the rectangular pulses can be used for defining a point in time. For the person skilled in the art it goes without saying that other pulses having steep edges can also be used as clock signals. In this case, the clock signal should be chosen in a manner adapted to the respective pulsed laser whose pulses are intended to be retrievable by means of the clock signal. The pulses of the clock signal by means of which a temporal retrieval of a laser pulse is triggerable are designated as clock pulses. A signal for retrieval can also be designated as a retrieval signal, wherein the pulses thereof which control a temporal retrieval at the laser pulses are designated as retrieval pulses.

The light train output by a pulsed laser is regarded as a laser beam. A laser beam thus specifies the optical path along which the light pulses, designated as laser pulses, propagate.

The positioning of laser pulses is understood to mean directing the laser beam onto a position of an object. By this means, a position of an interaction of a laser pulse with the object is defined and the laser pulse is thus "positioned".

Individualizing information is considered to be information which, from a totality of objects of identical type, individually identifies a group of objects or individual objects therefrom. An indication "diplomatic passport" individualizes a group of passports from the totality of the passports of a country. By contrast, a serial number individualizes an individual passport from the group of the totality of passports. Personalizing information is considered to be such information which is assigned to a person and is at least partly individual to said person. The personalizing information can include, for example, a name, a date of birth, a place of birth, an address or else a photograph of the face or further biometric features or the like.

Preferred Embodiments

In order to mark microscript or fine patterns onto an object or to be able to process an object in a fine processing grid, in one embodiment the comparator device is designed to evaluate threshold value conditions comprising a lower limit threshold value and it is provided that the logic result signal assumes the value TRUE, if the voltage of the pulse energy signal exceeds the lower limit threshold value, and otherwise assumes the value FALSE, or alternatively the logic result signal assumes the value TRUE if the voltage of the pulse energy signal falls below the lower limit threshold value, and otherwise assumes the value FALSE. Depending on the configuration of the gate circuit used or the configuration of the clock signal, it may be advantageous, when the limit threshold value is exceeded by the voltage of the pulse energy signal, to generate a result signal which assumes the value TRUE, or alternatively to generate a result signal which assumes the value FALSE. Such an embodiment is particularly suitable for implementing "black-and-white" information when processing the object, in particular when marking the object. Since a voltage value should always be considered with respect to a reference potential, a maximum pulse energy can be associated with a positive voltage or alternatively with a negative voltage. Depending on this choice, a presence of a high pulse energy is linked to a limit threshold value being exceeded or a limit threshold value being undershot.

In order to be in a position to be able to perform processings not just with a single pulse energy, in one development it is provided that the filter device has a changeover device and, in one switching state, designated as filter state, the voltage source is connected to the energy signal control output and, in another switching state, designated as bypass state, the pulse energy signal received at the control input is passed to the energy control output. While in the filter state processing is possible in a fine spatial grid with high contrast, but only with a single pulse energy, processing with variable pulse energy is possible in the other, so-called bypass state of the changeover device. Thus, by way of example, it is possible to mark an image of the face of a person with gray-scale values onto the object, for example a passport document, i.e. to produce it for example in a passport document. In the filter state, by contrast, it is possible to produce microscript having line widths in the range of one or a few marking dots. Driving of the pulsed laser in the bypass state is designated as driving in the bypass method mode, in which the pulse energy signal is used as the energy control signal and the clock signal is used as the retrieval signal.

The merely delayed energy rise of the pulse energy in the bypass state (or in the case of driving in the bypass method mode) in the case of a change in the demanded pulse energy acts during a marking or production of gray-scale images to the effect that the latter are not imaged with contrast as high as predefined by the original processing information, which is the image information. While black pixels are assigned a maximum voltage, gray-scale values, the lighter they become, are assigned lower voltage values. If jumps from very light gray-scale values to very dark or black values occur in the gray-scale image, then the laser apparatus, if the changeover device of the filter device is operated in the bypass state, is not able to adequately adapt the pulse energy, and so such transitions are "blurred" and do not have the desired contrast sharpness. In order to improve this it is possible to perform post-processing at such contrast transitions in such a way that renewed processing with a predefined pulse energy is carried out. During the post-processing, the changeover device is then operated in the filter state. This means that the pulsed laser is driven during the outputting of the pulse energy signal in accordance with the processing information by means of the bypass method mode, and otherwise it is not driven thus, that is to say that otherwise a pulse energy signal is compared with the threshold value condition and the logic result signal is generated and the clock signal is passed to the gate and the gate is controlled by means of the logic result signal and a retrieval signal is thereby generated.

In one preferred development, which makes possible such an improved marking of gray-scale images, it is provided that the control device comprises an information filter device, which performs a high-pass filtering of the processing information and creates edge processing information in the process. The edge processing information is information specifying the positions at which large differences in contrast from light to dark occur in the graphical information to be produced. Furthermore, the control device is designed such that firstly pulse energy signals are output in accordance with the processing information and subsequently they are output in accordance with the edge processing information. The high-pass filtering of the processing information yields the edge processing information. If it is assumed that each gray-scale value or black is assigned a value which increases with the degree of blackening, and if a high-pass filtering is carried out then a high-pass-filtered value is obtained for each processing position. These values are particularly high at those locations at which a particularly large change in gray-scale value occurs. It is thus possible, at the locations at which the edge processing information has high values, to perform an additional laser marking. In this case, the edge processing information can be used in the same way as processing information for generating the pulse energy signal. A suitable choice of the threshold value energy for the threshold value predefinition and a correspondingly adapted predefinition for the control voltage make it possible to improve the contrast improvement at the edges in a second marking pass.

In another embodiment, it can be provided that the processing information is output repeatedly and in each case only markings for voltages of the pulse energy signal which correspond to a specific gray-scale value or a range of gray-scale values are performed. For this purpose, in one embodiment, it is provided that the comparator device is designed to evaluate threshold value conditions which comprise a predefined voltage range, and the logic result signal assumes the value TRUE if the voltage of the pulse energy signal lies in the predefined voltage range, and otherwise assumes the value FALSE, or alternatively the logic result signal assumes the value FALSE if the voltage of the pulse energy signal lies in the predefined voltage range, and otherwise assumes the value TRUE. The different alternatives make possible different gate configurations. The gate can implement the information of the clock signal in the logic state TRUE, or in another configuration, in the state FALSE.

In another embodiment, the comparator device is designed such that it can evaluate threshold value conditions comprising a predefined voltage range. The latter can be specified by a lower limit threshold value and by an upper limit threshold value. In this other embodiment, the comparator device comprises, for example, two comparator circuits that compare the voltage of the pulse energy signal with the limit threshold values. The result signal is set to the value TRUE if the voltage lies above the lower limit threshold value and below the upper limit threshold value, and is otherwise set to the value FALSE. This embodiment makes it possible to perform processing steps with a predefined pulse energy which, in accordance with the processing information, should be performed with pulse energies lying in the range represented by the predefined voltage range. Other configurations are also possible in which the threshold value conditions is specified by means of a limit threshold value and an interval voltage.

In order to facilitate the temporal coordination of generating the laser pulses and positioning the laser beam on or in the object to the processed, in one embodiment it is provided that the control device is additionally designed to control a beam guiding device, in a manner adapted to the pulse energy signal and the clock signal i.e. in a manner temporally correlated with these signals.

In one preferred embodiment, the filter device comprises an interface via which the predefinition of the control voltage and/or the threshold value condition and/or a switching predefinition for changing over the changeover device can be detected. In one embodiment, it can be provided that the changeover device chooses its switching state in a manner dependent on the predefinition for the control voltage. If the predefinition for the control voltage is chosen, for example, such that the latter assumes a value of zero and, in a manner coupled therewith, the adjustable voltage source would supply a voltage of zero volts at the energy signal output, this can be interpreted as a selection of the bypass switching state and the changeover device can be transferred to the bypass state. If the predefinition for the control voltage deviates from the value zero, then a change is made into the filter state. The interface can be an arbitrary interface for communicating the information for the desired voltage to be set; by way of example, an analog interface can be involved, wherein a voltage to be set is assigned to each applied voltage value. Alternatively, interfaces on which communication protocols can be employed are also appropriate here, for example an RS232 interface, a USB interface or the like.

In one embodiment, the control device is designed to generate and output a threshold value condition assigned to the processing information and/or the predefinition for the control voltage assigned to the processing information and/or, if appropriate, a switching state predefinition and/or a threshold value condition assigned to the edge processing information and/or the predefinition for the control voltage assigned to the edge processing information.

In one preferred embodiment, the pulsed laser is a fiber laser, preferably a diode-pumped fiber laser. In one preferred embodiment, the beam guiding device is realized using at least one galvanometer.

The features of the method according to the invention have the same advantages as those of the laser apparatus. The same correspondingly applies to the features of the filter device which have the same advantages of those of the laser apparatus and of the method.

The invention is explained in greater detail below with reference to a drawing, in which:

DESCRIPTION OF THE INVENTION

Figure 1:
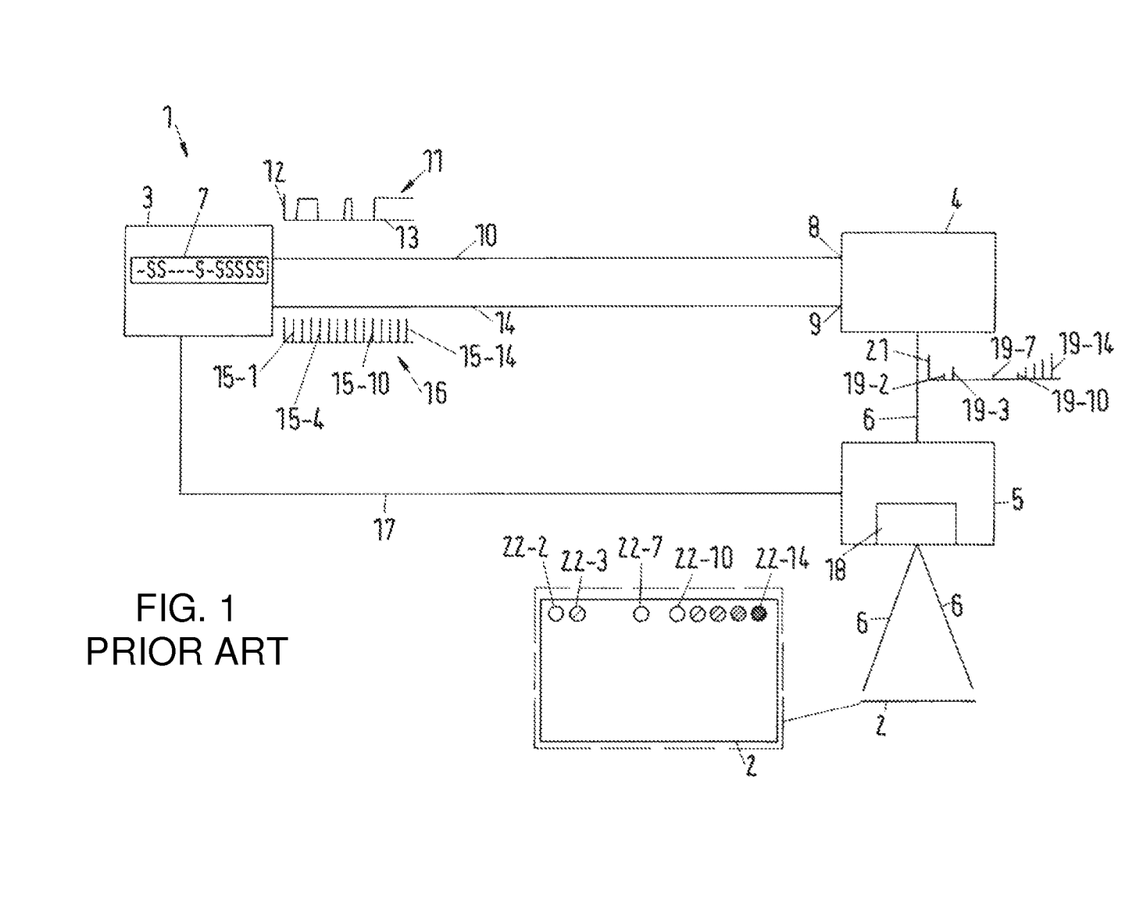
FIG. 1: shows a schematic illustration of a laser apparatus according to the prior art.

FIG. 1 schematically illustrates a laser processing apparatus 1 for processing an object 2. The laser processing apparatus comprises a control device 3, which controls firstly a pulsed laser 4 and secondly a beam guiding device 5. The beam guiding device 5 guides a laser beam 6 of the pulsed laser 4 onto a position of the object 2 in a targeted manner.

A processing or marking of the object 2 is performed in accordance with processing information 7. In the example illustrated in a simplified fashion, the processing information represents a pixelated line, that is to say a line decomposed into pixels. In the example illustrated, the positions on the object 2 which are assigned to the pixels are intended either to remain unmarked, which is symbolized by a "–", or to be blackened, which is identified by an "S". If the object is processed at a position with a laser pulse having a pulse energy below a minimum energy threshold, then generally no material change occurs. In order to achieve blackening, a maximum pulse energy is required in accordance with the design of the pulsed laser described here. For the person skilled in the art, it goes without saying that pulsed lasers exist whose laser pulses can achieve sufficient desired blackening using a single laser pulse, even if the pulsed laser is not operated with the maximum possible pulse energy. Hereinafter it is assumed in each case that the pulsed laser is chosen and dimensioned such that a maximum pulse energy brings about optimum blackening of the object, but does not cause disruption over and above that, or a marking of adjacent locations representing other pixels is impaired.

In the optimum case, the laser pulses of the laser radiation which impinge on locations which are not intended to be marked have a pulse energy of 0. This is tantamount to the fact that the laser emits no pulse.

Hereinafter, no distinction will be made in this respect as to whether no laser pulse or a laser pulse having an energy below the minimum energy threshold is generated. In both cases, mention will be made of laser pulses having a pulse energy of 0. They are understood to mean laser pulses that are not really generated and such laser pulses which do not have a sufficient energy to effect a material change from the object.

The pulsed laser 4 has an energy control input 8 to which can be applied an analog signal, the voltage of which controls a laser pulse energy. The greater the applied voltage, the greater the pulse energy output by the laser. In addition, the pulsed laser 4 has a retrieval input 9 for receiving a signal by means of which a retrieval of the laser pulses is controllable temporally.

In order to perform this energy control, the control device 3 generates a pulse energy signal 10 on the basis of processing information 7, the voltage profile of said pulse energy signal being graphically plotted schematically. The voltage 12 is plotted against the time 13. The pulse energy signal 10 is generated in a manner temporally correlated with a clock signal 14 having short clock pulses 15, which are often also designated as trigger pulses, at equidistant time intervals, as is indicated in the schematic graphical representation 16. The voltage is again plotted against the time. The pulse energy signal 10 is connected to the energy control input and the clock signal 14 is connected to the retrieval input 9 of the pulsed laser 4.

The pulse energy signal 10 has a minimum voltage at times which correspond to clock pulses 15-1, 15-4 to 15-6, 15-8 and 15-9 of the clock signal 14 which retrieve laser pulses 19-1, 19-4 to 19-6, 19-8 and 19-9 which are passed via the beam guiding device 5 to locations of the object 2 which are not intended to be marked. Correspondingly the pulse energy signal 10 has a maximum voltage at those times which correspond to clock pulses 15-2, 15-3, 15-7, 15-10 to 15-14 of the clock signal 14 which retrieve laser pulses 19-2, 19-3, 19-7, 19-10 to 19-14, which are passed to locations at which the object 2 is intended to be marked, i.e. blackened.

It is evident that the control of the beam guiding device 5 in a manner adapted to the clock signal 14, i.e. in a manner temporally correlated with said clock signal, is effected by means of a control signal 17 generated by the control device 3. The beam guiding device 5 preferably comprises a galvanometer 18 for bringing about the beam guiding of the laser beam 6.

Since the pulsed laser 4 has a low-pass filter characteristic, the generated laser pulses 19-2, 19-3, 19-7, 19-10 to 19-14 which are intended to bring about blackening do not all have the maximum laser energy required for this purpose. As is evident from the schematic graphical representation 20, in which a pulse energy 21 is plotted against the time 13.

It can be discerned that the pulse energy of the individual laser pulses 19 after a change in the voltage of the pulse energy signal from 0 to the maximum value, for example, 10 V, increases only step by step. It is not until after approximately 3 to 5 temporally directly successive laser pulses 19 with a required maximum pulse energy that this maximum pulse energy is also actually achieved.

As a result, this is manifested by the fact that a series of pixels 22-1 to 22-14 have different gray-scale values, but are not black. In particular, a pixel 22-7 whose adjacent pixels 22-6, 22-8 are not marked (and are not intended to be marked either) has only a light gray shade. This is unsatisfactory since a contrast is insufficient.

Figure 2:
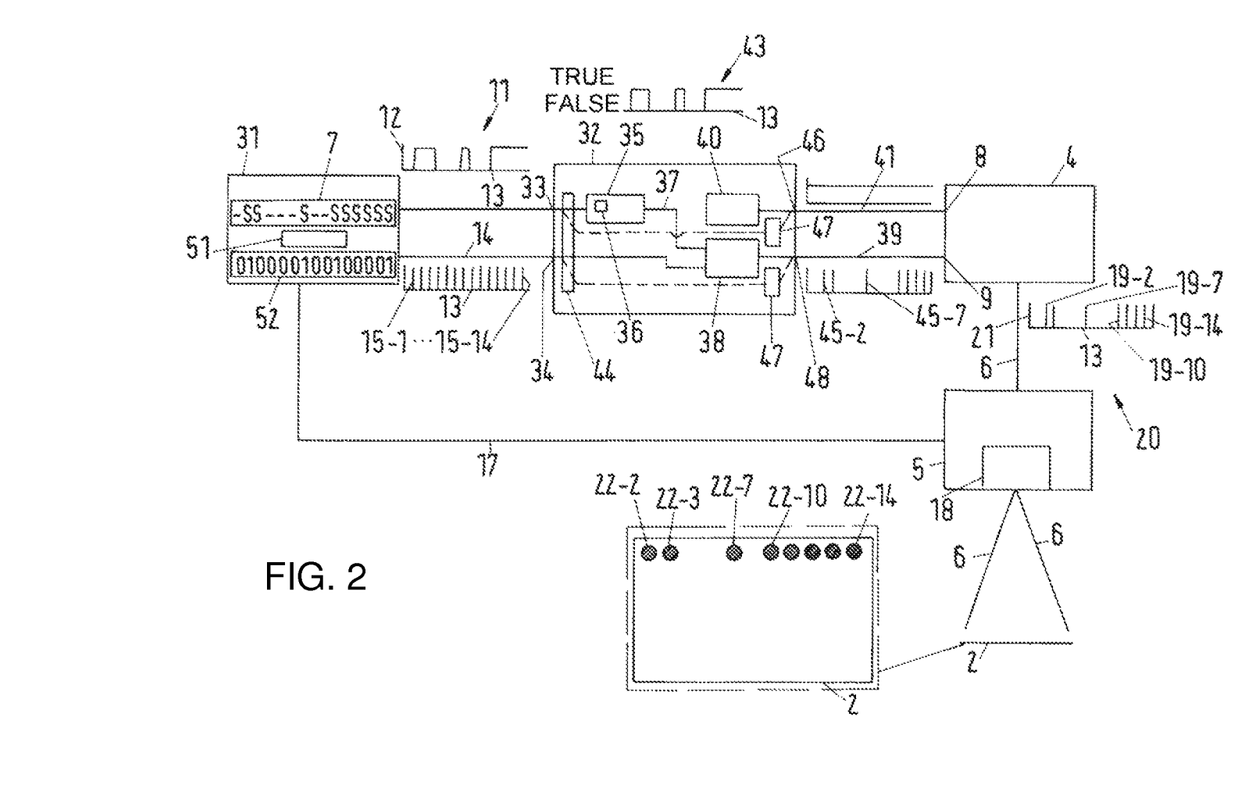
FIG. 2: shows a schematic illustration of an embodiment of a laser processing apparatus.

FIG. 2 schematically illustrates an embodiment of a laser processing apparatus 31 with which a marking of an object 2 configured as a document is performed on the basis of the same processing information 7. Identical or identically acting technical features are identified by the same reference signs in all of the figures.

As in the case of the laser processing apparatus 1 according to the prior art, shown in FIG. 1, the pulsed laser 4 having the energy control input 8 and the retrieval input 9 generates a laser beam 6 composed of individual laser pulses 19. The laser beam 6 is guided by the beam guiding device 5, which preferably comprises a galvanometer 18 for this purpose.

As in the case of the embodiment according to the prior art, the control device 31 generates a pulse energy signal 10 on the basis of the processing information, the voltage profile 11 of said pulse energy signal being identical to that generated by the control device 3 according to the prior art.

In the case of the embodiment of a laser processing apparatus 30 according to FIG. 2, the pulse energy signal 10 and the clock signal 11 are not passed directly to the energy control input 8 and the retrieval input 9 of the pulsed laser 4. However, a filter device 32 is provided between the control device 31 and the laser 4.

The filter device 32 comprises a pulse energy input 33 for receiving the pulse energy signal 10. In addition, the filter device 32 comprises a clock signal input 34 for receiving the clock signal 14.

A voltage of the pulse energy signal 10 is compared with a threshold value condition 36 in a comparator device 35. The result of the comparison is represented by means of a logic result signal 37. By means of a graphical representation 43, the comparison result is plotted against the time 13, by way of example. In one embodiment, the result signal 37 assumes the logic value TRUE if the threshold value condition is met, and otherwise the value FALSE. Since a threshold value condition can also be formulated in a logically negated manner, the choice can be oppositely made in other embodiments. A threshold value condition can be formulated for example as follows: "is the voltage of the pulse energy signal greater than a lower limit threshold value?". Alternatively, the threshold value condition could be formulated as follows: "does the voltage of the pulse energy signal fall below the lower limit threshold value?". Depending on the choice of threshold value condition, the latter would therefore be met or not met for a given voltage value of the pulse energy signal. It is assumed hereinafter, however, that the logic result signal 37 assumes the value TRUE if the threshold value condition 36 is met, and otherwise the value FALSE.

In general, the logic signal TRUE is associated with one voltage level and the value FALSE is associated with another voltage level, for example 0 V.

The clock signal 14 is passed to a gate 38, which is controlled by the logic result signal 37. If the logic result signal has the value TRUE, then the clock signal 14 is conducted through the gate 38 and a retrieval signal 39 is thus generated, which comprises retrieval pulses 45 corresponding to those of the clock signal. If the logic result signal has the value FALSE, the gate effects blocking and the retrieval signal 39 has a predefined value, for example a voltage of 0 V. The gate 38 can be realized by a gate circuit designed, for example, as an AND circuit. The retrieval signal 39 is output at a retrieval signal output 48. It should be noted at this juncture that an optical signal can also be used as the clock signal 14. The clock pulses 15 then correspond to light pulses, for example. It is important to emphasize that the retrieval signal 39 comprises retrieval pulses 45-2, 45-3, 45-7, 45-10 to 45-14, which correspond to those clock pulses 15-2, 15-3, 15-7, 15-10 to 15-14 which are in turn temporally assigned to a voltage of the pulse energy signal which meets the threshold value condition. The remaining clock pulses 15-1, 15-4 to 15-6, 15-8, 15-9 of the clock signal 14 are as it were "removed" and are not contained in the retrieval signal 19, as is indicated graphically. Clock pulses 15-1, 15-4 to 15-6, 15-8, 15-9 which are to be assigned to voltage values of the pulse energy signal 10 which do not meet the threshold value condition are therefore blocked by the gate 38 and not forwarded. For these clock pulses 15-1, 15-4 to 15-6, 15-8, 15-9 there are no counterparts in the retrieval signal 39.

Furthermore, the filter device 32 has a voltage source 40, which generates an energy control signal 41 that is stabilized with regard to the voltage. Preferably, the voltage source is adjustable, such that the voltage of the energy control signal 41 is generated in accordance with a predefinition for a control voltage.

Via an interface 42 the filter device 31 can receive the predefinition for the control voltage. Likewise, the latter can alternatively or additionally be adjustable by means of a mechanical actuator (not illustrated) at the filter device 32.

In one embodiment, the threshold value condition 36 can also be detectable via the interface 42. In one embodiment the comparator device 35 is designed to evaluate threshold value conditions which comprises a lower limit threshold value. For this purpose, the comparator device 35 has to have a comparison circuit that compares the voltage with the lower limit threshold value and generates a result signal having the value TRUE if the voltage of the pulse energy signal 10 exceeds the lower limit threshold value.

In another embodiment the comparator device is designed such that it can evaluate threshold value conditions comprising a predefined voltage range. The latter can be specified by a lower limit threshold value and by an upper limit threshold value. Further configurations that specify a limit threshold value and an interval voltage are also possible. In this other embodiment, the comparator device 35 comprises for example two comparator circuits that compare the voltage of the pulse energy signal with the limit threshold values. The result signal 37 is set to the value TRUE if the voltage lies above the lower limit threshold value and below the upper limit threshold value and is otherwise set to the value FALSE. This embodiment makes it possible to perform processing steps with a predefined pulse energy which, in accordance with the processing information, should be performed with pulse energies lying in the range represented by the predefined voltage range.

In order nevertheless to be able to perform processing steps with variable pulse energies, for example to mark (to produce) a gray-scale image, the filter device 31 according to FIG. 2 has a changeover device 44. In one switching state, designated as a filter state, the pulse energy signal is fed to the comparator device and the clock signal is fed to the gate 38 and the energy control signal 41 is generated by the voltage source 40 and output. Consequently, the voltage source is connected to the energy control signal output 46. In this state, high-contrast (black-and-white) information, for example a microscript, can be marked (produced). In a further switching state, called bypass state, the pulse energy signal 10 is connected to the energy control signal output 46, such that the energy control signal 41 is supplied by the pulse energy signal. Furthermore, the clock signal 14 is passed directly as the retrieval signal 39 to a retrieval signal output 48 or the gate 38 is put into that state such that each clock pulse 15 generates a retrieval pulse 45. It is possible for the pulse energy signal 10 and/or the clock signal 14 to be passed via a delay circuit 47 in order to obtain a temporal adaptation to the signal processing durations which occur in the filter state, in order to maintain an adaptation to the beam guiding by the beam guiding device 5.

In one embodiment, the control device 31 has an information filter device 51, which subjects the processing information to high-pass filtering and thus generates edge processing information 52. For each processing location of the object to be processed, there is now processing information specifying a pulse energy for a processing step at this location, and edge processing information containing an indication about the extent to which the pulse energy, in accordance with the processing information, deviates from the pulse energy of the preceding adjacent location to be processed on the object. If the pulse energy increases from one location to the next, then the latter has a high value in the edge processing information. The edge processing information contains information as to how a "contrast edge", a change from light to dark in the generated information, can be reworked.

If the processing information 7 is then used to mark the object in the bypass state of the changeover device 44 in the filter device 31, then a gray-scale imaging is marked, for example, the edges of which are washed out and have low contrast on account of the low-pass filter property of the pulsed laser 4, as explained in connection with the embodiment according to FIG. 1.

Afterward, with identical renewed driving of the beam guiding device 5, renewed processing of the object is performed wherein the edge processing information 52 is used for generating the pulse energy signal 10 and the filter device 31 with the changeover device 44 is operated in the filter state. The threshold value condition 36 is set such that only locations are marked at which an abrupt change in the processing energy occurs in the processing information, and the edge processing information thus has high values. The voltage of the energy control signal 41 generated by the voltage source 40 can be chosen to be moderate in many cases, since a partial blackening was already effected in the first processing step. The marking or processing in accordance with the edge processing information is thus effected congruently with the processing in accordance with the processing information 7 and provides for contrast improvement. It goes without saying that this post-processing can be restricted to a portion of the processing information, representing for example a historical image.

Likewise, a changeover between the filter state and the bypass state can also be effected without post-processing during the processing of the processing information, in order to mark different portions of the processing information in accordance with the different advantages of the changeover states. Gray shades can be generated in the bypass state; high-contrast and locally highly resolved fine structures can be marked in the filter state.

For the person skilled in the art it goes without saying that only exemplary embodiments have been described. In particular, the described processing method and the laser processing apparatus and the filter device are particularly suitable for marking individualizing and/or personalizing information into an object embodied as a security document.

List of reference signs
1 Laser processing apparatus
2 Object
3 Control device
4 Pulsed laser
5 Beam guiding device
6 Laser beam
7 Image processing information
8 Energy control input
9 Retrieval input
10 Pulsed energy signal
11 Voltage profile
12 Voltage
13 Time
14 Clock signal
15 Clock pulses
16 Graphical representation
17 Control signal
18 Galvonometer
19 Laser pusles 20 Graphical representation
21 Pulse energy
22 Pixel
30 Laser processing apparatus
31 Control device
32 Filter device
33 Pulse energy input
34 Clock signal input
35 Comparator device
36 Threshold value condition
37 Result signal
38 Gate
39 Retrieval signal
40 Voltage source
41 Energy control signal
42 Interface
43 Graphical representation
44 Changeover device
45 Retrieval pulses
46 Energy control signal output
47 Delay circuit
48 Retrieval signal output
51 Information filter device
52 Edge processing information

The invention claimed is:

1. A laser processing apparatus for laser processing of an object, comprising:
   a pulsed laser controllable with regard to laser pulse energy and a temporal retrieval of laser pulses, said pulsed laser having an energy control input for receiving an analog signal with a voltage controlling the laser pulse energy, and a retrieval input for receiving a signal by means of which a retrieval of the laser pulses is controllable temporally;
   a control device, configured to generate, on a basis of processing information, a pulse energy signal which, in a manner temporally correlated with a clock signal assumes voltage values which represent the laser pulse energy for the laser pulses which are retrievable by means of the clock signal;
   a filter device, the pulse energy signal and the clock signal being passed into said filter device, said filter device having:
      a comparator device for comparing a voltage of the pulse energy signal with at least one predefinable threshold value condition and generating a logic result signal;
      a gate, to which the clock signal is passed, said gate being controlled by means of the logic result signal and thereby generating and outputting a retrieval signal; and
      an adjustable voltage source outputting an energy control signal with a voltage in accordance with a predefinition for a control voltage.

2. The apparatus according to claim 1, wherein:
   said comparator device evaluates the predefinable threshold value condition having a lower limit threshold value; and
   the logic result signal assumes a value TRUE, if a voltage of the pulse energy signal exceeds the lower limit threshold value, and otherwise assumes a value FALSE, or alternatively the logic result signal assumes the value TRUE if the voltage of the pulse energy signal falls below the lower limit threshold value, and otherwise assumes the value FALSE.

3. The apparatus according to claim 2, wherein said comparator device evaluates the predefinable threshold value condition which includes a predefined voltage range, and the logic result signal assumes the value TRUE if the voltage of the pulse energy signal lies in the predefined voltage range, and otherwise assumes the value FALSE, or alternatively the logic result signal assumes the value FALSE if the voltage of the pulse energy signal lies in the predefined voltage range, and otherwise assumes the value TRUE.

4. The apparatus according to claim 1, further comprising a beam guiding device, said control device controlling said beam guiding device in a manner adapted to the pulse energy signal and the clock signal.

5. The apparatus according to claim 1, wherein said filter device has:
   an energy control signal output; and
   a changeover device and, in one switching state, designated as filter state, said adjustable voltage source is connected to said energy control signal output and, in another switching state, designated as bypass state, the pulse energy signal received at said energy control input is passed to said energy control signal output and said gate is controlled such that the retrieval signal is identical to the clock signal.

6. The apparatus according to claim 1, wherein the laser processing apparatus is used for laser marking of a document produced as a plastic object.

7. The apparatus according to claim 1, wherein said filter device has:
   a retrieval signal output;
   an energy control signal output; and
   a changeover device and, in one switching state, designated as filter state, said adjustable voltage source is connected to said energy control signal output and, in another switching state, designated as bypass state, the pulse energy signal received at said energy control input is passed to said energy control signal output and said gate is controlled such that the retrieval signal is identical to the clock signal.

8. The apparatus according to claim 7, wherein said gate is controlled such that the clock signal is passed to said retrieval signal output.

9. A filter device for laser driving of a pulsed laser being controllable with regard to laser pulse energy and a temporal retrieval of laser pulses, the pulsed laser having an energy control input for receiving an analog signal with a voltage for controlling the laser pulse energy, and a retrieval input for receiving a signal by means of which a retrieval of the laser pulses is controllable temporally, the filter device comprising:
   a pulse energy input for receiving a pulse energy signal which, in a manner temporally correlated with a clock signal assumes voltage values representing pulse energy for the laser pulses retrievable by means of the clock signal;
   a clock signal input for receiving the clock signal;
   an energy control signal output;
   a retrieval signal output;
   a comparator device for comparing a voltage of the pulse energy signal with at least one predefinable threshold value condition and generating a logic result signal;
   a gate receiving the clock signal and controlled by means of the logic result signal and thereby generating a retrieval signal and outputting the retrieval signal at said retrieval signal output; and
   an adjustable voltage source outputting an energy control signal with a predefinable control voltage at said energy control signal output.

10. The filter device according to claim 9, further comprising a changeover device and, in one switching state, designated as filter state, said adjustable voltage source is connected to said energy control signal output and, in another switching state, designated as bypass state, the pulse energy signal received at said energy control input is passed to said energy control signal output and said gate is controlled such that the retrieval signal generated is identical to the clock signal, or the clock signal is passed to said retrieval signal output.

11. A method for controlling a pulsed laser controllable with regard to pulse energy and a temporal retrieval of laser pulses, during material processing of an object including during a marking of a plastic-based document, which comprises the steps of:

comparing a pulse energy signal which, in a manner temporally correlated with a clock signal assumes voltage values representing the pulse energy for the laser pulses for processing with a threshold value condition and generating a logic result signal;

passing the clock signal to a gate;

controlling the gate by means of the logic result signal and generating a retrieval signal thereby;

providing an energy control signal having a voltage in accordance with a predefinition for a control voltage; and using the retrieval signal and the energy control signal for controlling the pulsed laser.

12. The method according to claim 11, which further comprises driving the pulsed laser at times in a bypass method mode, in which the pulse energy signal is used as the energy control signal and the clock signal is used as the retrieval signal.

13. The method according to claim 11, which further comprises controlling a beam guiding device in a manner adapted to the pulse energy signal and the clock signal to position the laser pulses retrieved by the pulsed laser on the object in a controlled manner.

14. The method according to claim 13, which further comprises:

subjecting processing information to high-pass filtering and creating edge processing information in the process;

firstly outputting the pulse energy signal in accordance with the processing information and subsequently it is output in accordance with the edge processing information;

driving the beam guiding device such that the laser pulses assigned to a same processing position are emitted in accordance with the processing information and the edge processing information congruently successively onto the workpiece; and driving the pulsed laser during the outputting of the pulse energy signal in accordance with the processing information by means of a bypass method mode, and otherwise it is not driven thus.

* * * * *